(12) United States Patent
Kawashima et al.

(10) Patent No.: US 6,693,855 B2
(45) Date of Patent: Feb. 17, 2004

(54) OPTICAL DISC AND OPTICAL DISC APPARATUS

(75) Inventors: Tetsuji Kawashima, Kanagawa (JP); Yukio Shishido, Kanagawa (JP); Futoshi Tsukada, Kanagawa (JP); Kunihiko Miyake, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/852,574

(22) Filed: May 10, 2001

(65) Prior Publication Data

US 2002/0006084 A1 Jan. 17, 2002

(30) Foreign Application Priority Data

| May 12, 2000 | (JP) | ...................................... P2000-140949 |
| Apr. 27, 2001 | (JP) | ...................................... P2001-132156 |

(51) Int. Cl.$^7$ ............................................. G11B 7/007
(52) U.S. Cl. .................................. 369/30.1; 369/47.38
(58) Field of Search ........................... 369/30.1, 47.38

(56) References Cited

U.S. PATENT DOCUMENTS

| 4,142,209 | A | * | 2/1979 | Hedlund et al. ............... 386/95 |
| 5,244,705 | A | * | 9/1993 | Tsurushima et al. ........... 428/64 |
| 5,255,007 | A | * | 10/1993 | Bakx ............................ 346/1.1 |
| 5,313,443 | A | * | 5/1994 | Iitsuka ........................ 369/50 |
| 5,638,346 | A | * | 6/1997 | Aramaki |
| 5,703,854 | A | * | 12/1997 | Kuroda et al. ................ 369/50 |
| 5,862,123 | A | * | 1/1999 | Horie et al. .............. 369/275.4 |
| 5,978,333 | A | * | 11/1999 | Kobayashi et al. ....... 369/44.41 |
| 6,091,682 | A | * | 7/2000 | Hikima ........................ 369/47 |
| 6,091,686 | A | * | 7/2000 | Caffarelli et al. ........ 369/53.24 |
| 6,125,089 | A | * | 9/2000 | Shigemori ............... 369/47.22 |
| 6,137,768 | A | * | 10/2000 | Ishida et al. ............. 369/275.3 |
| 6,295,267 | B1 | * | 9/2001 | Takaku et al. ................ 369/83 |
| 6,446,073 | B1 | * | 9/2002 | D'Amato et al. ........... 707/101 |

* cited by examiner

Primary Examiner—Aristotelis M. Psitos
(74) Attorney, Agent, or Firm—Jay H. Maioli

(57) ABSTRACT

Physical addresses of the recording areas provided on an optical disc are represented in a time-axis data format and in a binary data format. The physical address value gradually increases from the inner part of the disc to the outer part of the disc, while the formats remain in one-to-one correspondence over the recording areas. The distance the optical head must move to reach a target recording area can therefore be calculated easily independently of where on the disc the optical head is located, enabling the optical head to quickly access the target recording area.

2 Claims, 12 Drawing Sheets

|   | $S_0$ |
|---|---|
| 0 | |
| 1 | $S_1$ |

| 2 | P | Q | R | S | T | U | V | W |
|---|---|---|---|---|---|---|---|---|
| . | | | | | | | | |
| . | | | | | | | | |
| 96 | | | | | | | | |
| 97 | | | | | | | | |

FIG. 7

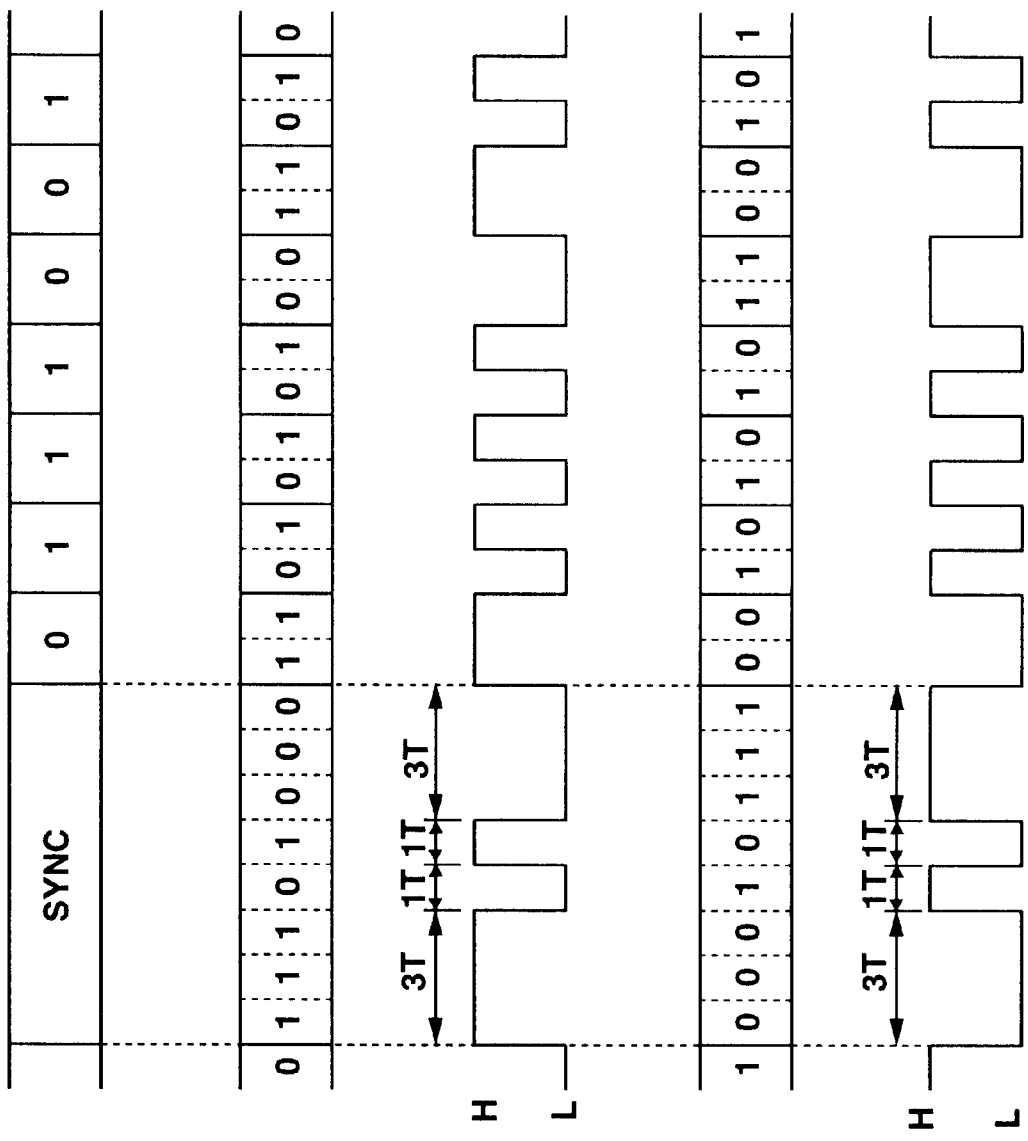

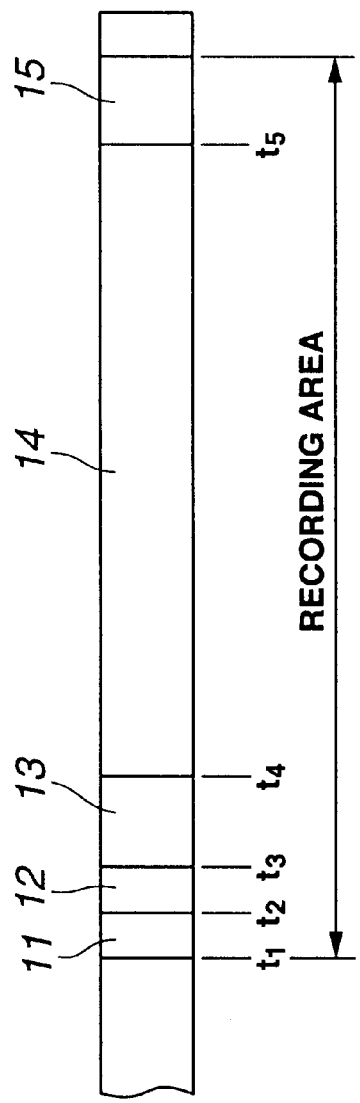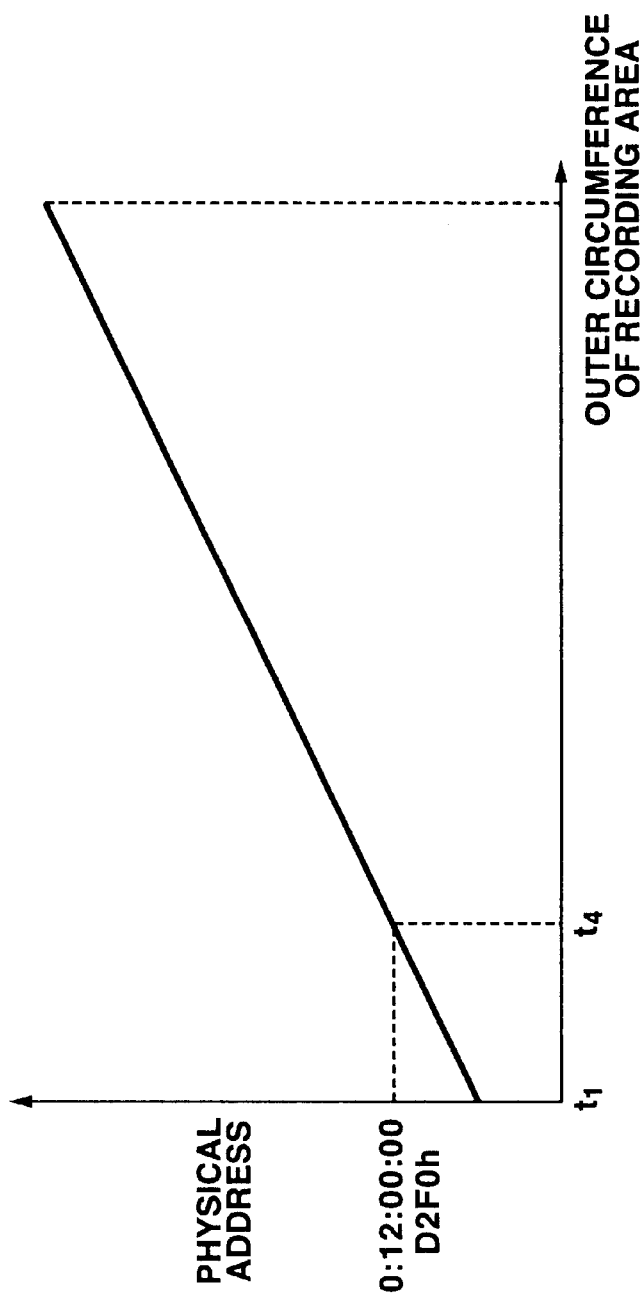

OPTICAL DISC AND OPTICAL DISC APPARATUS

BACKGROUND OF THE INVENTION

1. Field of the Invention

The present invention relates to an optical on and from which data is recorded and reproduced, and to an optical apparatus that uses the optical as a recording medium.

2. Description of the Related Art

Optical discs, generally known as "compact discs," are used in increasing numbers. Each optical comprises a resin substrate that is about 120 mm in diameter and about 1.2 mm in thickness. The substrate has a signal-recording surface having recording areas, in which digital data is recorded. The digital data has been subjected to error correction performed by using CIRCs (Cross Interleave Reed-Solomon Codes) or to EFM (Eight-to-Fourteen Modulation).

Compact discs (hereinafter referred to as "CDs") were developed first as media for recording digital audio data. As they are commonly used in increasing numbers, they are now put to various uses.

Particularly in recent years, optical discs for reproducing only called "CD-ROM (Read-Only Memory) have come into common use. This is because personal computers are now used in many households as information-processing apparatuses, and CD-ROMs are used as media to record the information processed by the personal computers.

Optical discs of other types, which can record data recorded on the reproduction-only optical discs such as CD-ROMs, have been developed and come into practical use. They are recordable optical discs called "CD-R (Recordable)" and rewritable optical discs known as "CD-RWs."

Hereinafter, the CDs (Compacts) and the other optical discs derived from the CDs shall be generally referred to as "CD-families." The recording areas of each CD-family, in which data may be recorded, have a physical address each. The physical address indicates the position of the recording area. To record data in a target recording area or reproduce data therefrom, the optical head of an optical apparatus makes an access to the target recording area in accordance with the physical address of the recording area.

The access of the optical head to the target recording area is controlled by the controller incorporated in the optical apparatus. The controller calculates the distance the optical head should move to reach the target area, from the physical address of the target area. The optical head is moved in the radial direction of the CD-family for the distance the controller has calculated. The optical head can therefore make an access to the target recording area of the CD-family.

The physical address of each recording area of any CD-family is written in the Q channel of the subcode that is contained in the data recorded on the recording area. In a CD-ROM developed for the purpose of recording computer data and the like, the physical address of each recording area is written not only in the Q channel of the subcode, but also in the starting part of user data, called "block header." In a CD-R or a CD-RW on which data can be recorded, the physical address of each recording area is written not only in the Q channel and block header of the subcode, but also in the wobbling groove that is made in the surface of the substrate.

In the CD-familys of the existing format, the physical address of each recording area is written in the MSF (Minutes: Seconds: Frames). This is because CDs were developed in order to record digital audio data, which is best handled if the physical addresses of the recording areas are time-axis data.

Thus, in a CD-family of the existing format, the MSF-format physical address is set at the minimum value of "00 (minute): 00 (second): 00 (frame)," for the starting position of the program area which is the innermost user-data area of the disc. The MSF-format physical address of the recording area next to the program area has an MSF-format physical address set at a greater value. The farther each recording area is located from the starting position of the program area, the greater the value its MSF-format physical address has.

A TOC (Table of Contents) is written in the read-in area and the like that are provided on the center part of each CD-family, for recording data other than the user data. Of these areas provided on the center part of the disc, the innermost one that is immediately adjacent to the above-mentioned program area has the value of "99 (minutes): 59 (seconds): 74 (frames)," which is the maximal in the MSF format. In the center part of the disc, the farther each area is located from the center of the disc, the greater the value its MSF-format physical address has. The value of a physical address changes from the maximum to the minimum, and vice versa, at the starting position of the program area.

Since physical addresses are set as described above, the physical address of the starting part of user data is represented by time-axis data of "00 (minute): 00 (second): 00 (frame)." This scheme of setting of physical addresses is very useful in the case where the user data is, for example, audio data.

If physical addresses are set as indicated above, however, the value of a physical address changes from the maximum to the minimum, and vice versa, at the starting position of the program area. To move the optical head from any program area to the center part of the disc, or vice versa, to reach any target position on the disc, complex calculation is required to find the distance the optical head must move, from the physical addresses of recording areas. Consequently, it would take much time to calculate the distance.

A double-density CD format is now studied, which is compatible with the exiting CD format and which can increase the storage capacity of a CD twice as much as that of the existing CD format. It is proposed that, in the double-density CD format, a higher unit of time, i.e., hour, be added to the MSF-format physical address, to provide an HMSF (Hour; Minutes: Seconds: Frames) format. If the physical addresses are so set in the double-density CD format, however, more complex calculation is required to find the distance the optical head should move from any program area to the center part of the disc, or vice versa, to reach any target position on the disc. This may greatly increase the time the optical head needs to make an access to the target recording area.

BRIEF SUMMARY OF THE INVENTION

The present invention has been made in view of the foregoing. An object of the invention is to provide an optical disc with which it is easy to calculate the distance an optical head should move to any target recording area, thus achieving a fast access to the target recording area. Another object of the invention is to provide an optical disc apparatus that uses such an optical disc as a recording medium.

According to the first aspect of the present invention, there is provided an optical disc that has a recording surface including a program area for recording user data and auxiliary recording areas for recording data other than the user data; and a spiral track provided in the recording surface, wobbling at a predetermined frequency and defining wobble information. The wobble information represents physical addresses of the recording areas, the value of which gradually increases from the innermost part of the disc toward the outermost part of the disc, over the entire radius of the recording area.

According to the second aspect of the invention, there is provided an optical disc that has a recording surface including a data area for recording program data and a read-in area provided inside the data area. In the optical disc, the physical address of each recording area provided in the recording surface is recorded in both the first format that is time-axis data and the second format that is binary data. The value of the physical address gradually increases from the innermost part of the disc toward the outermost part of the disc, over the entire radius of the recording area, while the first format and the second format remains in one-to-one correspondence.

According to the third aspect of the invention, there is provided an optical disc apparatus that comprises: a motor for rotating an optical disc; an optical head for applying a focussed beam to the optical disc rotated by the motor and detecting a beam reflected from the optical disc; an access mechanism for causing the optical head to make an access to any desired position on the optical disc; and a controller for detecting physical addresses of recording areas provided on the optical disc and for controlling the access mechanism in accordance with the physical addresses. When the optical disc is one that has recording areas, each having a physical address recorded in both the first format that is time-axis data and the second format that is binary data, the controller determines that the physical address value gradually increases from the innermost part toward the outermost part of this disc, while the first format and the second format remains in one-to-one correspondence, for all recording areas including a program area for recording user data and auxiliary recording areas for recording data other than the user data. The controller then controls the access mechanism in accordance with the physical address thus increasing.

According to the fourth aspect of this invention, there is provided an optical disc apparatus that comprises: a motor for rotating an optical disc having a recording surface including a program area for recording user data and auxiliary recording areas for recording data other than the user data, and a spiral track provided in the recording surface, wobbling at a predetermined frequency and defining wobble information; an optical head for applying a focussed beam to the optical disc rotated by the motor and detecting a beam reflected from the optical disc; and a controller for controlling the optical head, thereby to record user data and subcodes in the recording surface including the program area and auxiliary recording areas such that address data contained in each subcode gradually increases from the inner most part toward the outermost part of this disc, over the entire radius of the disc.

According to the fifth aspect of the invention, there is provided an optical disc apparatus that comprises: a motor for rotating an optical disc; an optical head for applying a focused beam to the optical disc rotated by the motor and detecting a beam reflected from the optical disc; an access mechanism for causing the optical head to make an access to any desired position on the optical disc; and a controller for determining whether the optical disc rotated by the motor is a first optical disc or a second optical disc, and controlling the access mechanism such that physical addresses are recorded on the optical disc along with the user data, in a first recording method when the optical disc rotated by the motor is found to be the first disc, and in a second recording method when the optical disc rotated by the motor is found to be the second optical disc having a lower recording density than the first optical disc.

In an optical disc according to the present invention, the physical address value gradually increases from the innermost part of the disc toward the outermost part of the disc, over the entire radius of the disc. Therefore, the distance the optical head must move to reach a target recording area can be calculated by using the same formula, no matter where on the disc the optical is located at present. Namely, the distance can be calculated easily, whereby the optical head fast makes an access to the target recording area.

An optical disc apparatus according to the invention comprises a disc-rotating means, an access means, and an optical head. To the disc rotating means there is connected to an optical disc on which the physical addresses of recording areas are recorded in both the first format (i.e., time-axis data format) and the second format (binary data format). The physical address value gradually increases from the innermost part of the disc toward the outermost part of the disc, over the entire radius of the disc. The access means is controlled in accordance with the physical addresses. Since the physical addresses are recorded in both the first format and the second format, it is easy to calculate the distance the optical head must move to reach a target recording area. Hence, the optical head fast makes an access to the target recording area.

BRIEF DESCRIPTION OF THE SEVERAL VIEWS OF THE DRAWING

FIG. 7 is a diagram showing the data configuration of a subcode;

FIGS. 10A to 10E is a timing chart illustrating the pattern of the frame-synchronizing signal SYNC that is contained in the wobble information recorded on the single-density CD-R, FIG. 10A showing the wobble information, FIG. 10B depicting the pattern of a channel bit following a channel bit "0," FIG. 10C showing a bi-phase signal that corresponds to the channel-bit pattern of FIG. 10B, FIG. 10D depicting the pattern of a channel bit following a channel bit "1," and FIG. 10E depicting a bi-phase signal that corresponds to the channel-bit pattern of FIG. 10D;

FIGS. 13A and 13B are diagrams explaining physical addresses set for the double-density CD-R, FIG. 13A showing a recording area provided on the single-density CD-R and FIG. 13B depicting the physical addresses set at various positions shown in FIG. 13A;

DETAILED DESCRIPTION OF THE INVENTION

Embodiments of the present invention will be described in detail, with reference to the accompanying drawings.

The first embodiment of the invention is a CD-R, i.e., a recordable optical disc. Nonetheless, the present invention is not limited to a CD-R. It can be applied to any kind of an optical disc of CD format, including a CD-RW (i.e., rewritable optical disc), a CD-ROM (i.e., read-only optical disc), and the like.

The CD-R, which is the first embodiment of the invention, is of double-density CD format and can record twice as much data as a CD-R of the existing single-density CD format. (Hereinafter, a CD-R of double-density CD format shall be referred to as "double-density CD-R," and a CD-R of single-density CD format as "single-density CD-R".) The invention is not limited to a double-density CD-R, nevertheless. It can be also applied to a single-density CD-R and an optical disc of any other generation such as the next-generation CD-R that can store more data than a double-density CD-R.

The double-density CD-R according to the invention will be described, in comparison with a single-density CD-R. In the following description, both the double-density CD-R and the single-density CD-R will be referred to as "CD-R" when any feature common to them is explained.

Figure 1:
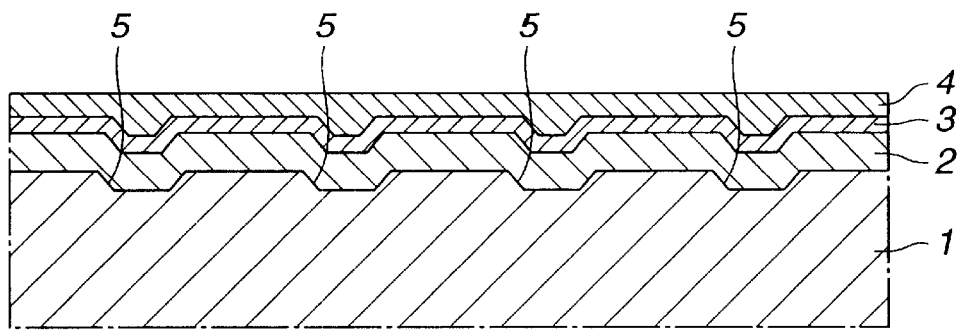
FIG. 1 is a sectional view of a CD-R according to the present invention.

As shown in FIG. 1, a CD-R comprises a disc-shaped substrate 1, a recording layer 2, a reflecting film 3, and a protective layer 4. The substrate 1 is made of resin such as polymethylmethacrylate (PMMA), polycarbonate (PC) or the like. The substrate 1 has a diameter of 120 mm and a thickness of 1.2 mm. The recording layer 2 made of organic dye-based recording material is provided on the substrate 1. The layer 2 has been formed by means of spin coating. The reflecting film 3 made of, for example, gold (Au) or silver (Ag) or the like, is provided on the recording layer 2. The protective layer 4 made of, for example, ultraviolet-curing resin or the like is provided on the reflecting film 3.

A recording laser beam modulated in accordance with the data to be written is applied to the recording layer 2. The part of the recording layer 2, irradiated with the laser beam, interacts with the part of the substrate 1, contacting this part of the layer 2. The interface between these parts of the substrate 1 and layer 2 is thereby deformed, making a train of permanent pits in the surface of the recording layer 2. The train of pits corresponds to the data. To reproduce the data from the CD-R, a reproducing laser beam is applied to the train of pits. The light reflected from the pits has intensity different from the light reflected from any other part of the recording layer 2. Thus, the data is read from the CD-R by detecting the light reflected from the pits.

Figure 2A:
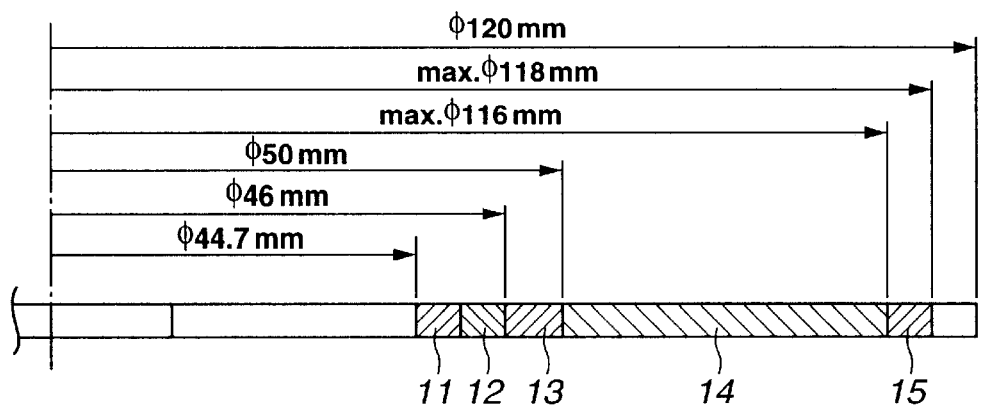
FIG. 2A illustrates the layout of recording areas on a single-density CD-R according to the invention.
Figure 2B:
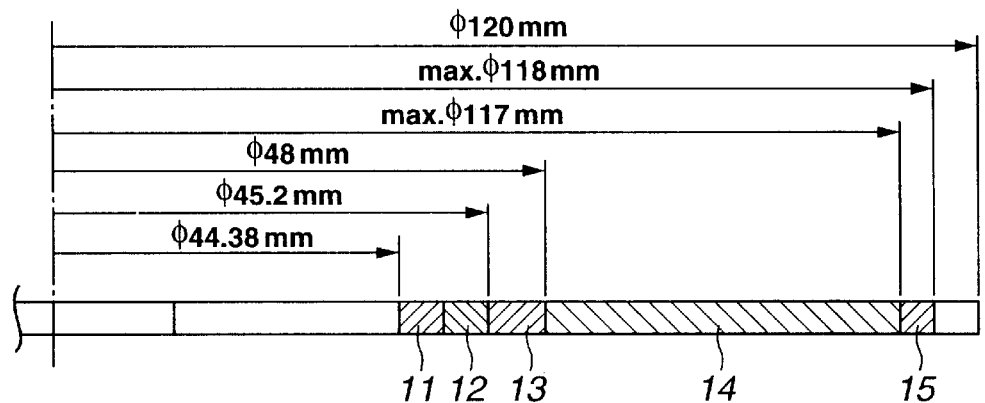
FIG. 2B shows the layout of recording areas on a double-density CD-R according to this invention.

FIG. 2A illustrates the layout of recording areas on a single-density CD-R according to the invention. FIG. 2B shows the layout of recording areas on a double-density CD-R according to the invention. As FIGS. 2A and 2B show, either CD-R has a PCA (Power Calibration Area) 11, a PMA (Program Memory Area) 12, a read-in area 13, a program area 14 and a read-out area 15. The areas 11 to 15 are arranged from the center of the CD-R in the order they are mentioned. The program area 14 consists of one cession as shown in FIGS. 2A and 2B. Alternatively, the program area 14 may consist of two or more cessions. If so, a read-in area 13 and a read-out area 15 will be provided for each of the cessions.

The PCA 11 is a region provided for calibrating the power of the recording laser beam. It consists of a test area and a count area. The test area is used to perform trial writing of data. The count area is used to record the data that shows the use-state of the test area. The PMA 12 is an area provided for temporarily storing the data representing the mode of data to be written, the data-writing start position, the data-writing end position, and the like, for each logic track. The PCA 11 and the PMA 12 are used only when data is recorded on the CD-R. Hence, the optical head of an optical disc apparatus need not make an access to the PCA 11 or the PMA 12 after finalization is carried out, finishing the data-writing in the read-in area 13 and the read-out area 15.

The read-in area 13 is a region used to read the data written in the program area 14. Data representing, for example, the table of contents is recorded in the read-in area 13.

The program area 14 is a region in which user data can be written. Its program area 14 has 99 logic tracks at most.

The read-out area 15 is a region in which various data items about the disc are recorded. The read-out area 15, which is the outermost area on the disc, functions as a buffering region that prevents the optical pickup of an optical disc apparatus from running over the circumference of the optical disc.

In the single-density CD-R shown in FIG. 2A, the read-in area 13 is an annular region that has inner and outer circumferences, respectively, at the distances of 46 mm and 50 mm from the center of the disc. (The read-in area 13 is the first cession area and shall hereinafter be referred to as "innermost read-in area.") The program area 14 is an annular region that has inner and outer circumferences, respectively, at distances of 50 mm and 116 mm from the center of the disc. The read-out area 15 is an annular region that has inner and outer circumferences, respectively, at the distances of 116 mm and 118 mm from the center of the optical disc. (The read-out area 15 is the last cession area and shall hereinafter be referred to as "outermost read-in area.") The PCA 11 and the PMA 12 are provided in the center part of the disc, inside the innermost read-in area 13. Note that the PCA 11 has its inner circumference at the distance of 44.7 mm from the center of the optical disc.

In the double-density CD-R shown in FIG. 2B, the read-in area 13 is an annular region that has inner and outer circumferences, respectively, at the distances of 45.2 mm and 48 mm from the center of the disc. The program area 14 is an annular region that has inner and outer circumferences, respectively, at distances of 48 mm and 117 mm from the center of the disc. The read-out area 15 is an annular region that has inner and outer circumferences, respectively, at the distances of 117 mm and 118 mm from the center of the optical disc. The PCA 11 and the PMA 12 are provided in the center part of the disc, inside the innermost read-in area 13. Note that the PCA 11 has its inner circumference at the distance of 44.38 mm from the center of the optical disc.

Having this specific layout of recording areas, the double-density CD-R is compatible with the single-density CD-R shown in FIG. 2A. It can yet have a program area 14 as large as is possible. In other words, the double-density CD-R of FIG. 2B is designed not only to increase the recording density, but also to expand the program data area 14 to record more user data, without detriment to its compatibility with the single-density CD-R.

Figure 3:
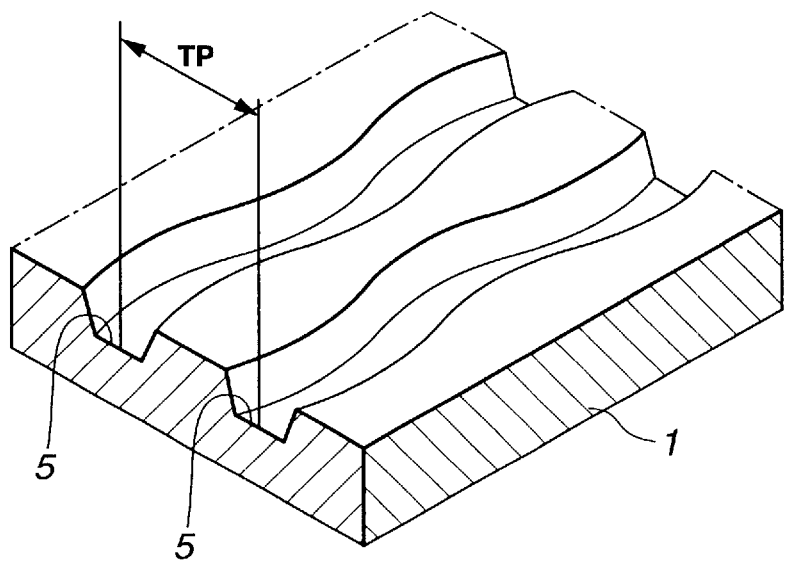
FIG. 3 is a magnified perspective view, depicting a part of the substrate of the CD-R.

As shown in FIGS. 1 and 3, the substrate 1 of the optical disc has a wobbling groove 5 made in its surface. The wobbling groove 5 is a guide groove and is, for example, a spiral one. The wobbling groove 5 is made in that region of the substrate 1 which extends from the inner circumference of the PCA 11 to the outer circumference of the read-out area 15. Those parts of the recording layer 2, which partly lie in the turns of the wobbling groove 5, define recording tracks in which data can be recorded. As shown in FIG. 3, the turns of the wobbling groove 5 are arranged at a track pitch TP. The track pitch TP is about 1.6 μm in the single-density CD-R, and about 1.1 μm in the double-density CD-R. Having a track pitch shorter than that of the single-density CD-R, the double-density CD-R has a higher recording density than the single-density CD-R.

The double-density CD-R has not only a short track pitch TP but also high recording density (i.e., linear density) along the recording tracks. To be more specific, the double-density CD-R has the shortest pit length (3T) of about 0.62 μm, whereas the single-density CD-R has the shortest pit length (3T) of about 0.83 μm.

Having its track pitch TP decreased and its linear density increased, the double-density CD-R has a recording density about twice as high as that of the single-density CD-R and a recording capacity about twice as large as that of the single-density CD-R. Thus, the double-density CD-R can record data of about 1 GB or more.

The configuration of the data to be recorded on the CD-R will be described below. The user data to be recorded on the CD-R has been subjected to error correction that uses convoluted double codes known as CIRCs (Cross Interleave Reed-Solomon Codes). The data is further subjected to modulation called EFM (Eight-to-Fourteen Modulation) and then written on the CR-R.

In the error correction using the CIRCs, the user data is converted to Reed-Solomon codes (C2 codes) in units of 24 bytes (12 words), and 4-byte parity data (Q parity) is added to each Reed-Solomon code. Each unit of the user data and the Q parity data added to it, which amount to 28 bytes, are subjected to interleaving. The 28-byte data is converted to a Reed-Solomon code (C1 code), and 4-byte parity data (P parity) is added to this Reed-Solomon code. As a result, 32-byte data is generated.

Figure 4:
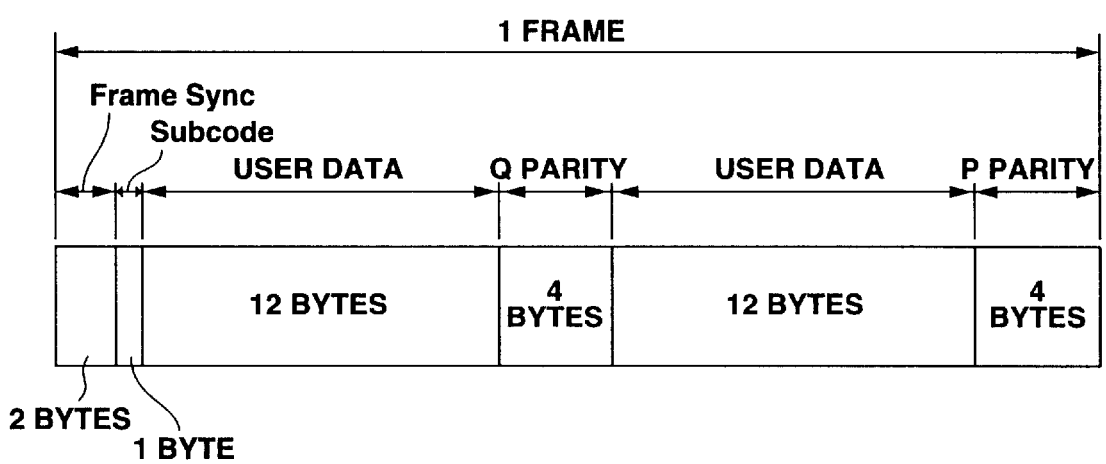
FIG. 4 is a diagram illustrating the configuration of a frame to be recorded on the CD-R.

In the course of the error correction using CIRCs, a 4-byte Q parity data and a 4-byte P parity data are added to each 24-byte user data item, generating a 32-byte data item. A 2-byte frame sync signal and a 1-byte subcode are added to the head of the 32-byte data item, thereby generating one frame as shown in FIG. 4. The frame thus generated is a unit of data that will be transmitted.

Figure 5:
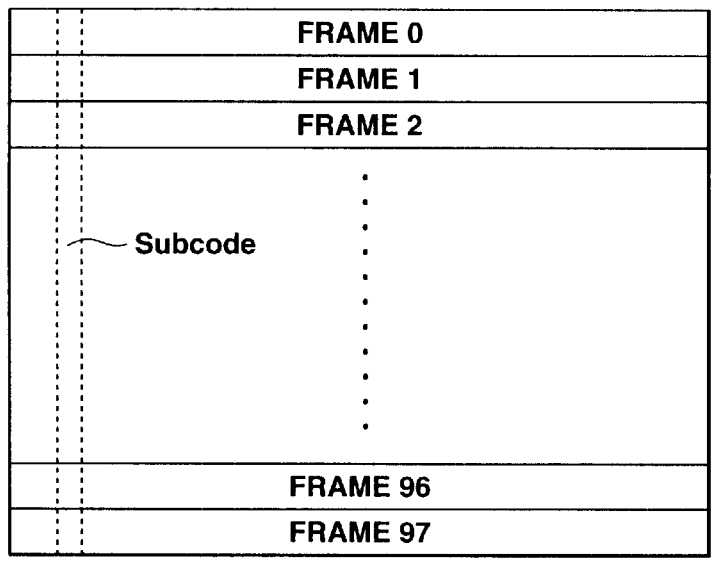
FIG. 5 is a diagram showing the configuration of a data block recorded on the CD-R.

The subcode indicates eight channels P to W. It consists of eight bits (i.e., one byte), each representing one channel. It should be noted that 98 subcodes for 98 frames make a kind of information. As shown in FIG. 5, the 98 frames constitute a data block (data sector), i.e., a unit of the user data to which an optical disc apparatus make an access.

Figure 6:
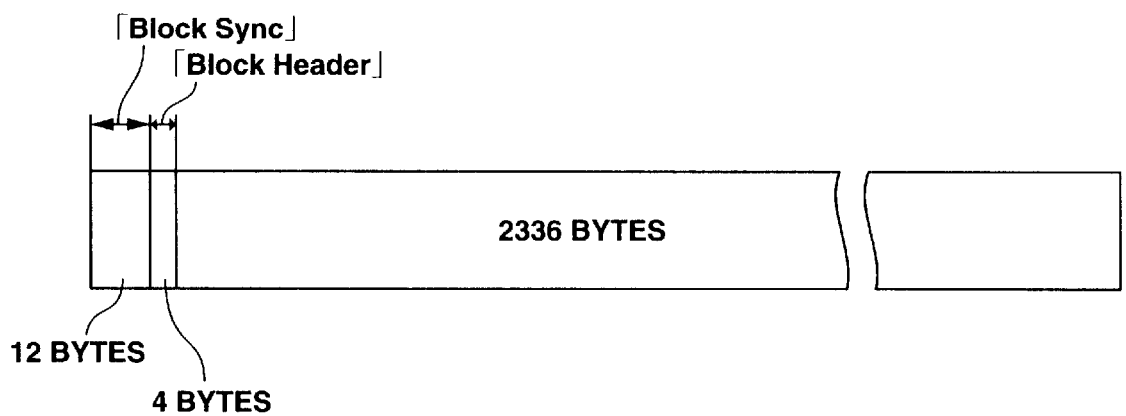
FIG. 6 is a diagram depicting the configuration of user data.

The user data contained in one data block amounts to 2352 bytes (24 bytes×98). As shown in FIG. 6, the user data has, at its head, a 12-byte block sync signal and a 4-byte block header.

Figure 7:
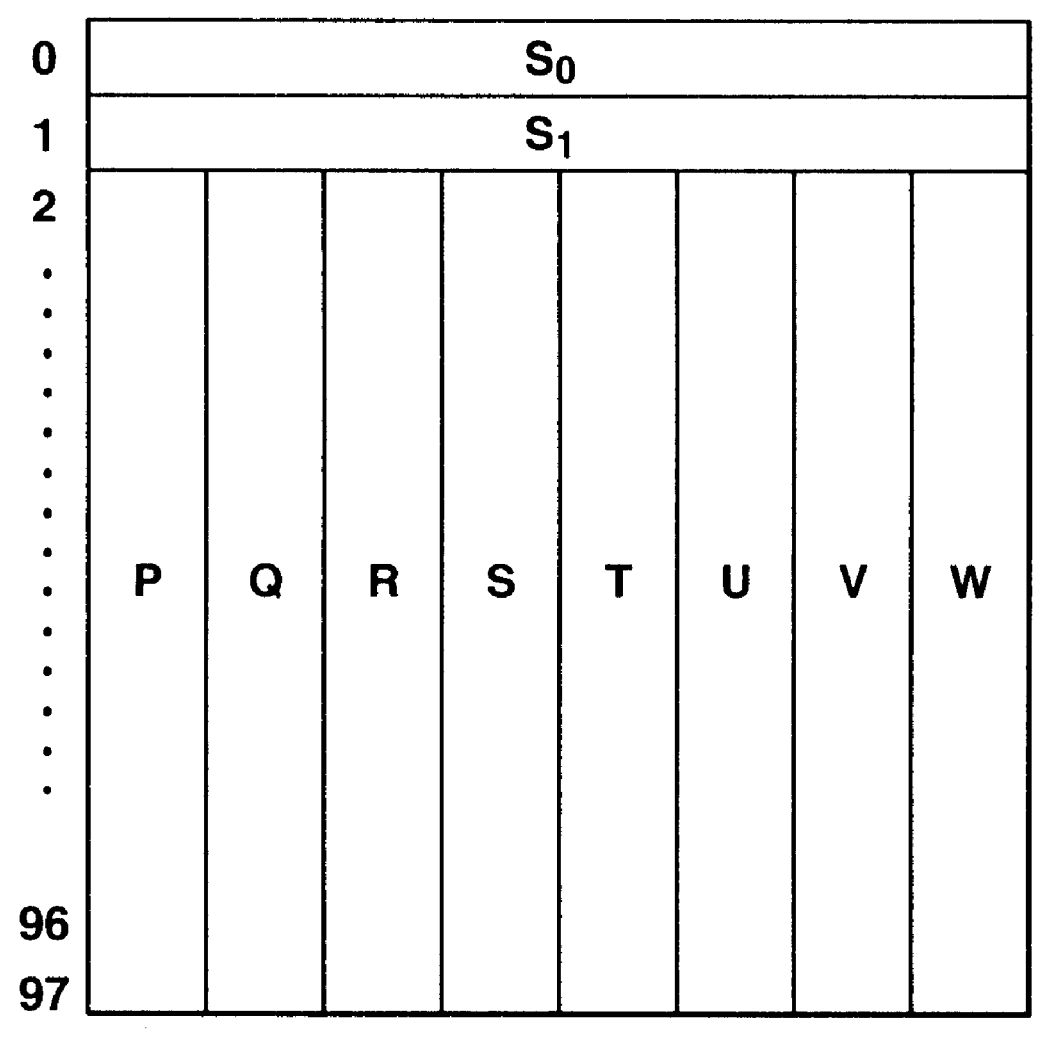

The subcodes contained in one data block amounts to 98 bytes. As shown in FIG. 7, the first two of these 98 bytes, i.e., the first two subcodes, are two 1-byte sync signals $S_0$ and $S_1$. Each of the remaining 96 bytes, or 96 subcodes, is allocated to channels P to W. Of these channels, channels P and Q are used for an access to the data block that contains the subcode. The remaining channels R to W are used for recording data accompanying the user data.

Data of the configuration described above will be written on the CD-R, in the recording tracks that extend along the spiral wobbling groove 5 made in the surface of the recording layer 2.

The wobbling groove 5 slightly wobbles, drawing sine waves. The wobbling of the groove 5 define physical addresses on the CD-R and some other data. Thus, the physical addresses and other data can be acquired by reading the wobbling of the groove 5. Hereinafter, the physical addresses and the other data shall be generally called "wobble information."

As will be detailed later, the wobble information is recorded in the read-in area 13 and includes special information in addition to the address data. The special information includes the power of the recording laser beam. In the case of a CD-RW, the special information is extended, thus containing a data item representing the CD-RW power and a data item showing recording pulses.

The special information includes the target recording power, reference speed, disc-application code, disc type and disc sub-type, all pertaining to the disc. The target recording power recorded is the power-level of a laser beam that is applied to the disc while the disc is rotating at the reference speed. The disc-application code dictates the use of the disc, such as business use, special use (photograph-recording CD, Kara-OK CD, or the like), or household use. The disc type identifies the disc as a CD-R or a CD-RW and describes the recording density of the disc, either single density or double density. The disc sub-type indicates the rotating speed and either CAL or CLV type.

The special information further includes the start address of the read-in area and the start address of the read-out area. Still further, the information includes a manufacturer code, a product code and a material code.

The manufacturer code represents the manufacturer of the disc. The product code indicates the product type assigned to the disc (e.g., the model number, item code or the like). The material code specifies the material of the recording layer.

The wobble information is additional information including the lowest CLV (Constant Linear Velocity), the highest CLV, power multiplication factor ρ, target value γ, erase/record power ratio and the like, which are applied to control the spindle motor and the power of the laser beam. More precisely, the additional information includes a target power for the recording laser beam at the lowest recording speed, a target power for the recording laser beam at the highest recording speed, a power multiplication factor ρ for the lowest recording speed, a power multiplication factor ρ for the highest recording speed, an erase/record power ratio for the lowest recording speed, an erase/record power ratio for the highest recording speed, and the like. These items of additional information are used to control the, spindle motor and the power of the laser beam.

The wobble information is recorded in the form of frequency-modulated signals that exhibit the center frequency of, for example, 22.05 kHz when the CD-R is rotated at a predetermined velocity. One frame of the wobble information corresponds to one frame of the data (i.e., record data) to be written in any recording track. The record data is written in a track, in synchronism with the corresponding frame of the wobble information. The physical addresses of the recording areas are defined in accordance with a prescribed linear velocity.

Figure 8:
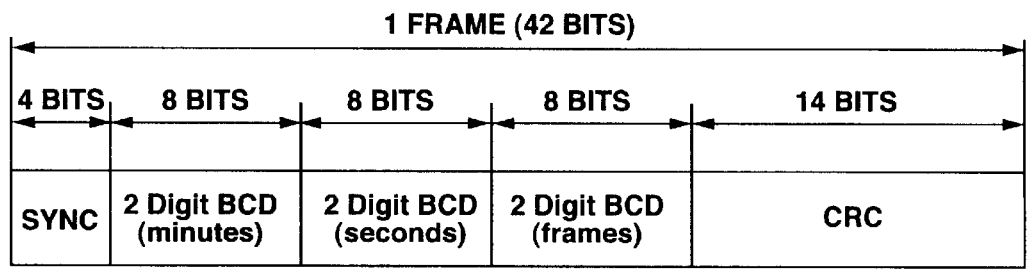
FIG. 8 is a diagram representing the frame configuration of wobble information written on the single-density CD-R.

FIG. 8 shows the frame configuration of wobble information recorded on the single-density CD-R. Each frame of the wobble information recorded on the single-density CD-R consists of 42 bits. Of these 42 bits, the first four constitute a frame-synchronizing signal SYNC. The following 24 bits constitute the physical address of the frame, which is time-axis data described in the MSF (Minutes: Seconds: Frames) format. More specifically, the three units of time, i.e., minute, second and frame, are defined by 2 digitBCDs (eight bits) each. The last 14 bits of the frame of the wobble information constitute a CRC (Cyclic Redundancy Code).

Figure 9:
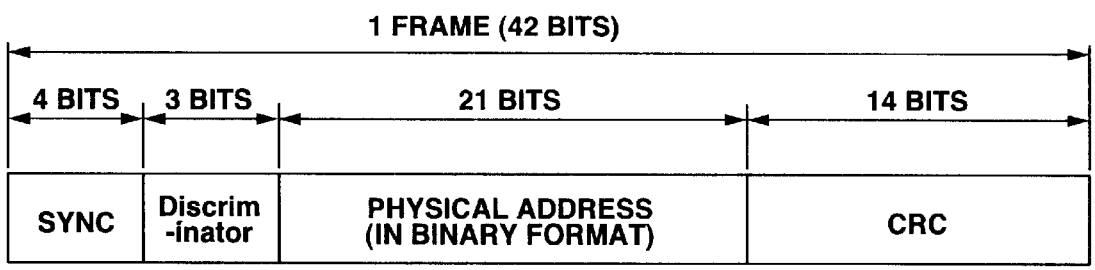
FIG. 9 is a diagram illustrating the frame configuration of wobble information written on the double-density CD-R.

FIG. 9 illustrates the frame configuration of wobble information recorded on the double-density CD-R. Like each frame of the wobble information recorded on the single-density CD-R, each frame of the wobble information on the double-density CD-R consists of 42 bits. Of these 42 bits, the first four constitute a frame-synchronizing signal SYNC. The following three bits are allocated to a discriminator. The following 21 bits following the discriminator constitute the physical address of the frame, which is time-axis data described in the hexadecimal binary format. The last 14 bits of the frame of the wobble information constitute a CRC.

As indicated above, the physical addresses of recording areas are written on the CD-R in the form of wobble information, no matter whether CD-R is a single-density one or a double-density one. Thus, the physical addresses can be acquired by reading the wobble information, even before data is written on the CD-R. In the case of the single-density CD-R, the physical addresses are time-axis data items described in the MSF format. In the case of the double-density CD-R, the physical addresses are described in the hexadecimal binary format.

The frame-synchronizing signal SYNC that is contained in the wobble information recorded on the single-density CD-R has one pattern, and the frame-synchronizing signal SYNC contained in the wobble information recorded on the double-density CD-R has another pattern.

An example of the pattern which the frame-synchronizing signal SYNC contained in the wobble information recorded on the single-density CD-R may have will be described with reference to FIGS. 10A to 10E.

The wobble information shown in FIG. 10A is subjected to bi-phase mark modulation, acquiring the channel-bit pattern illustrated in FIG. 10B or the channel-bit pattern shown in FIG. 10D. More correctly, if the bit immediately preceding the synchronizing signal SYNC contained in the wobble information is "0," the signal SYNC has the channel-bit pattern of "11101000" as shown in FIG. 10B. In this case, the bi-phase signal generated from the signal SYNC by means of bi-phase mark modulation has the waveform illustrated in FIG. 10C. On the other hand, if the bit immediately preceding the signal SYNC is "1," the signal SYNC has the channel-bit pattern of "00010111" as shown in FIG. 10D. In this case, the bi-phase signal generated from the signal SYNC by means of bi-phase mark modulation has the waveform illustrated in FIG. 10E. That is, the frame-synchronizing signal SYNC contained in the wobble information recorded on the single-density CD-R has a pattern that consists of two 3T waves of the opposite polarities and 1T waves connecting the 3T waves.

An example of the pattern which the frame-synchronizing signal SYNC contained in the wobble information recorded on the double-density CD-R may have will be described with reference to FIGS. 11A to 11E.

Figure 11A:
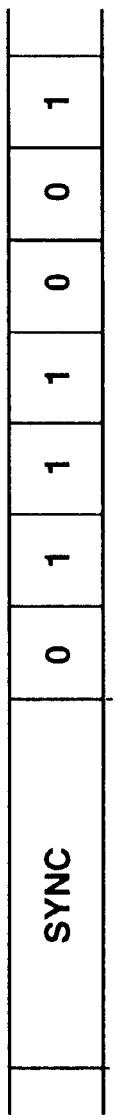
FIGS. 11A to 11E is a timing chart illustrating the pattern of the frame-synchronizing signal SYNC that is contained in the wobble information recorded on the double-density CD-R, FIG. 11A showing the wobble information, FIG. 11B depicting the pattern of a channel bit following a channel bit "0," FIG. 11C showing a bi-phase signal that corresponds to the channel-bit pattern of FIG. 11B, FIG. 11D depicting the pattern of a channel bit following a channel bit "1," and FIG. 11E depicting a bi-phase signal that corresponds to: the channel-bit pattern of FIG. 11D.
Figure 11B:
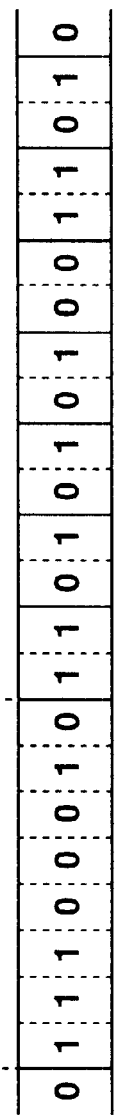
Figure 11C:
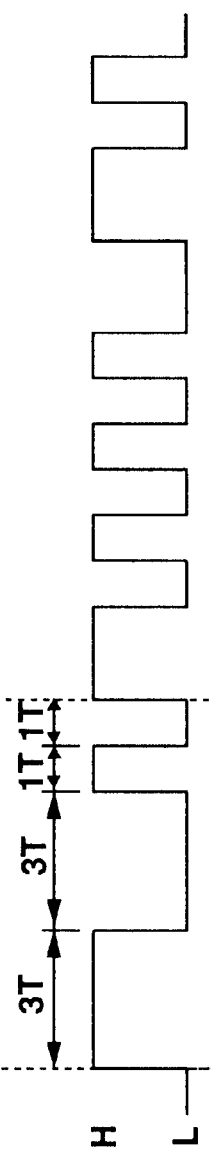
Figure 11D:
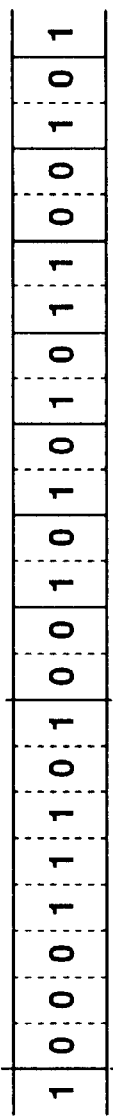
Figure 11E:
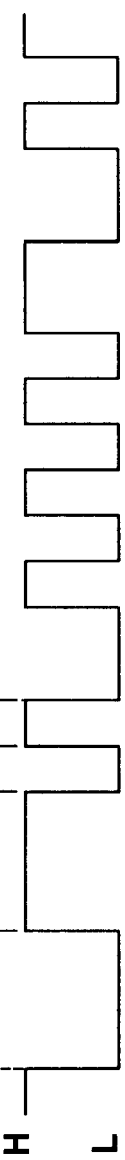

The wobble information shown in FIG. 11A is subjected to bi-phase mark modulation, acquiring the channel-bit pattern illustrated in FIG. 11B or the channel-bit pattern shown in FIG. 11D. More precisely, if the bit immediately preceding the synchronizing signal SYNC contained in the wobble information is "0," the signal SYNC has the channel-bit pattern of "11100010" as shown in FIG. 11B. If this is the case, the bi-phase signal generated from the signal SYNC by means of bi-phase mark modulation has the waveform illustrated in FIG. 11C. On the other hand, if the bit immediately preceding the signal SYNC is "1," the signal SYNC has the channel-bit pattern of "00011101" as shown in FIG. 11D. If so, the bi-phase signal generated from the signal SYNC by means of bi-phase mark modulation has the waveform illustrated in FIG. 11E. That is, the frame-synchronizing signal SYNC contained in the wobble information recorded on the double-density CD-R has a pattern that consists of consecutive 3T waves of the opposite polarities.

Thus, the synchronizing signal SYNC in the wobble information recorded on the single-density CD-R and the synchronizing signal SYNC in the wobble information recorded on the double-density CD-R are different from each other in terms of pattern. It is therefore possible to determine whether a single-density CD-R or a double-density CD-R is rotating in the optical disc apparatus, merely by detecting the wobble information and reading the synchronizing signal SYNC from the wobble information.

The physical addresses of recording areas provided on the CD-R are not only recorded in the form of wobble information as described above, but also contained in the data written on the CD-R. To be more specific, a physical address is represented by the Q-channel subcode (hereinafter referred to as "subcode Q") and the block header, both contained in a data block. Once the data block has been written on the CD-R, the physical address of the position on the disc, where the data is recorded, can be acquired by reading either the subcode Q or the block header.

In the single-density CD-R, the physical address of any recording area, which is represented by the subcode Q and the block header, is time-axis data that is described in the MSF format. That is, any physical address recorded on the single-density CD-R is a time-axis data item of the MSF format, no matter whether it is represented by wobble information, a subcode Q or a block header. The subcode Q and the block header, both contained in the same data block, represent the same physical address. The data block is written on that part of the single-density CD-R that is designated by the physical address represented by the wobble information. Namely, three physical addresses represented by the wobble information, subcode Q and block header, respectively, are all identical to one another.

In the double-density CD-R, the physical address of any recording area, which is represented by the subcode Q, is time-axis data that is described in the HMSF (Hours; Minutes: Seconds: Frames) format, and any physical address recorded represented by a block header is expressed in the hexadecimal binary format. That is, the physical address represented by the wobble information and the physical address represented by the block header are dictated in the hexadecimal binary format in the single-density CD-R. By contrast, the physical address represented by the subcode Q is expressed in the form of time-axis data of the HMSF format. In other words, an higher unit of time, i.e., hour (H) is added to the MSF format that expresses physical addresses on the single-density CD-R, enabling the double-density CD-R to record twice as much data as the single-density CD-R.

As mentioned above, each physical address on the double-density CD-R is written in both the HMSF format and the binary format: The HMSF and the binary format are in one-to-one correspondence. Hence, an HMSF-format physical address of "0 (hours): 00 (minutes): 00 (seconds): 00 (frames) corresponds to a binary-format physical address of "0000h." The subcode Q and block header that are contained in one data block represent the same physical address, though they differ in format. The data block is written on the part of the disc, which is designated by the physical address represented by the wobble information. The physical addresses that the wobble information and the block header represent, respectively, are essentially identical.

Any physical address described above indicates a physical position on the CD-R. To record data on the CD-R or reproduce data therefrom, the control section of an optical disc apparatus calculates from the physical address the distance the optical head must be moved in the radial direction of the CD-R. The access mechanism provided in the optical disc apparatus moves the optical head in the radial direction of the CD-R for the distance thus calculated. The optical head therefore makes an access to the target position on the CD-R. At the target position, the optical head records data on the CD-R or reproduces data from the CD-R. The optical disc apparatus will be described later in detail.

Figure 12A:
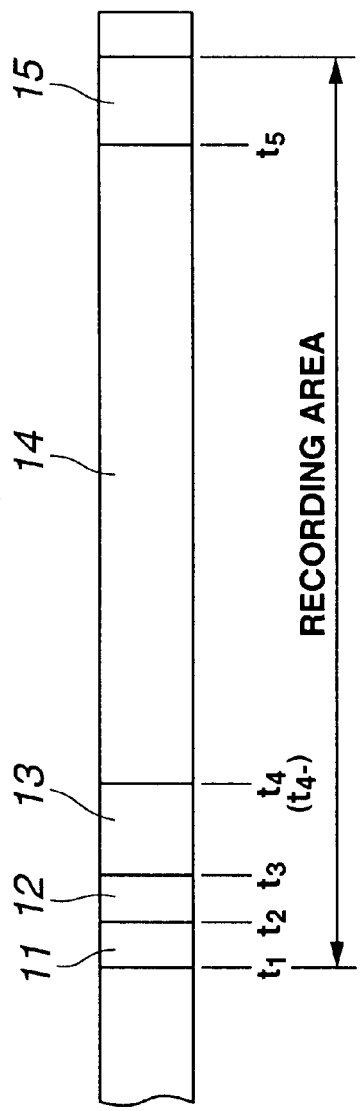
FIGS. 12A and 12B are diagrams explaining physical addresses set for the single-density CD-R, FIG. 12A showing a recording area provided on the single-density CD-R and FIG. 12B depicting the physical addresses set at various positions shown in FIG. 12A.
Figure 12B:
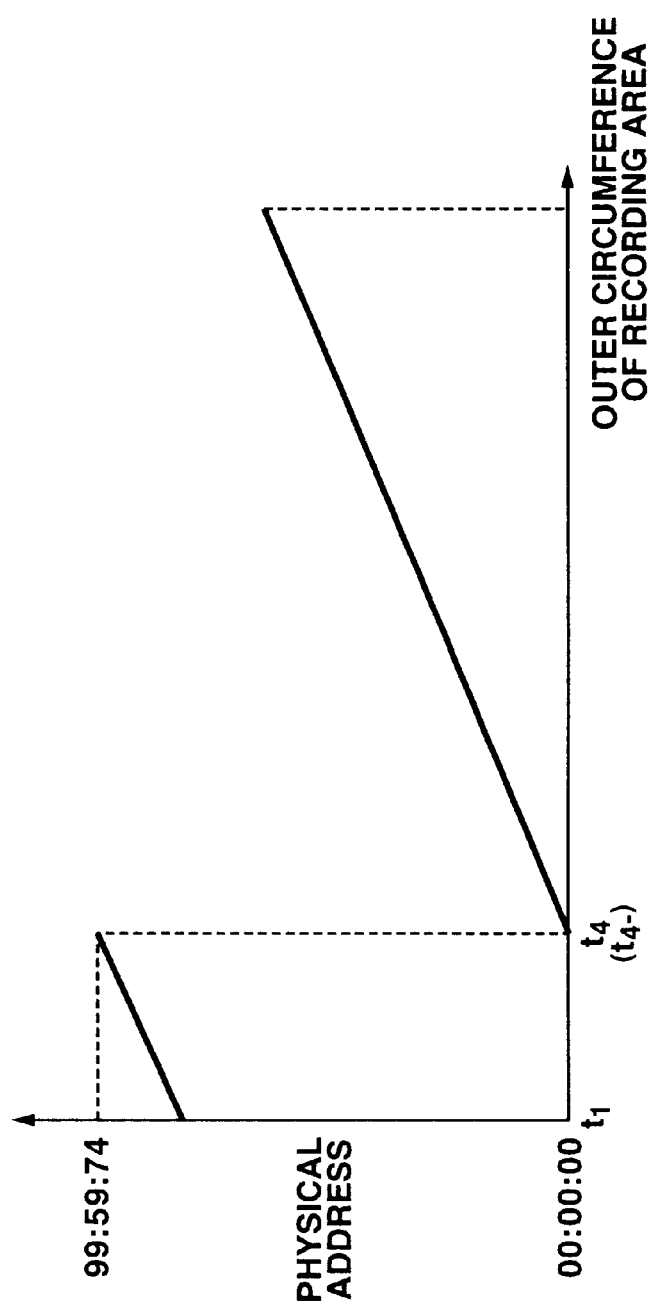

The physical addresses of the recording areas are set on the single-density CD-R, as is illustrated in FIGS. 12A and 12B. The physical address $t_4$ for the head of the program data area 14 for recording user data is set at the minimum value of "00 (minute): 00 (second): 00 (frame)." The physical address value gradually increases from the minimum value to the maximum value, from the physical address $t_4$ toward the outer circumference of the read-out area 15. As for the area inside the inner circumference of the program area 14, the physical address $t_4$ for the outer circumference of the innermost read-in area 13 immediately preceding the program area 14 is set at the maximum value in the MSF format, i.e., "99 (minutes): 59 (seconds): 74 (frames). The physical address value gradually increases from the head of the PCA 11 toward the outer circumference of the read-in area 13. The physical address $t_3$ for the head of the read-in area 13 is set at the value that is specific to the disc. The physical address $t_2$ for the head of the PMA 12 is set at the value that is obtained by subtracting the value of "00 (minutes): 13 (seconds): 25 (frames) from the physical address $t_3$ for the head of the innermost read-in area 13. The physical address $t_1$ for the head of the PCA 11 is set at the value obtained by subtracting the value of "00 (minutes): 35 (seconds): 65 (frames) from the physical address $t_3$. Like the physical address $t_3$, the physical address $t_5$ for the head of the outermost read-out area 15 is set at the value that is specific to the disc.

The physical addresses of the recording areas are set on the double-density CD-R, as is illustrated in FIGS. 13A and 13B. As seen from FIG. 13B, the physical address value, written in both the HMSF format and the binary format, gradually increases from the innermost part toward the outermost part of the disc. That is, the physical address value gradually increases from the innermost part of the disc toward the outermost part of the disc, whereas in the single-density CD-R the physical address abruptly decreases to the minimum value at the head of the program area 14 and then starts gradually increasing toward the outermost part of the disc.

More specifically, the physical address $t_1$ for the head of the PCA 11, i.e., the innermost recording area, is set at the value of "0 (hours): 07 (minutes): 28 (seconds): 50 (frames)" in the HMSF format, and at the value of "8372h" in the binary format. The physical address $t_2$ for the head of the PMA 12 is set at the value of "0 (hours): 08 (minutes): 00 (seconds): 00 (frames)" in the HMSF format, and at the value of "8CA0h" in the binary format. The physical address $t_3$ for the head of the read-in area 13 is set at the value of "0 (hours): 08 (minutes): 26 (seconds): 50 (frames)" in the HMSF format, and at the value of "9470h" in the binary format. The physical address $t_4$ for the head of the program area 14 is set at the value of "0 (hours): 12 (minutes): 00 (seconds): 00 (frames)" in the HMSF format, and at the value of "D2F0h" in the binary format. The physical address $t_5$ for the head of the read-out area 15 is set at the value that is specific to the disc.

As described above, the physical address value gradually increases toward the outermost part of the double-density CD-R. Therefore, the distance the optical head must move to reach the target recording area can be calculated by using the same formula no matter where on the disc the optical is located at present. Thus, the distance can be calculated easily, whereby the optical head fast makes an access to the target recording area.

The physical addresses on the double-density CD-R may be set in any other manner than described above, provided that they are written for all recording areas, in both the HMSF format and the binary format which are in one-to-one correspondence and that the physical address value gradually increases from the innermost part to the outermost part of the disc. Nonetheless, it is desired that the physical address $t_4$ for the head of the program area 14 be set at a HMSF-format value that is an integral multiple of four minutes.

Any physical address whose HMSF-format value is an integral multiple of four minutes has a binary-format value the least significant bit of which is "0." If the physical address $t_4$ for the head of the program area 14, in which user data is recorded and which is frequently used, has such an HMSF-format value, it is easy to calculate the distance the optical head should be moved. In addition, this enables designers to design double-density CD-Rs easily, even if they do not know much about double-density CD-Rs though having much knowledge of single-density CD-Rs in which the physical address abruptly decreases to the minimum value at the head of the program area 14 and then gradually increases toward the outermost part of the disc.

The PCA 11, PMA 12 and innermost read-in area 13, existing inside the program area 14, must have a total size of, in terms of time, about five minutes. Not to impart a negative value to the physical address $t_1$ for the head of the PCA 11, i.e., the innermost recording area, it is desirable to set the physical address $t_4$ for the head of the program area 14 at a value of "0 (hours): 8 (minutes): 00 (seconds): 00 (frames)" or "0 (hours): 12 (minutes): 00 (seconds): 00 (frames)" in the HMSF format. This is why the physical address $t_4$ is set at the HMSF-format value of "0 (hours): 12 (minutes): 00 (seconds): 00 (frames)" as described above.

The physical address $t_1$ for the head of the PCA 11 has the minimum value in both the HMSF format and the binary format. If the physical address $t_1$ has a negative value, the calculation of the distance the optical head must move will be complex. It is therefore desired that the physical address $t_1$ have a value of "0" or a positive value. The physical address $t_4$ for the head of the program area 14 may be set at a HMSF-format value that is an integral multiple of four minutes, as described above. In this case, the physical address $t_1$ for the head of the PCA 11 is set at a positive value.

Physical addresses are set, as indicated above, for the recording areas on the CD-R, i.e., a rewritable optical disc. The same method may be used to set physical addresses for the recording areas provided on a read-only optical disc such as a CD-ROM, as well. Since a CD-ROM has no wobbling grooves, however, the physical addresses are represented by only the subcode Q contained in the data block or by the subcode Q and the block header, both contained in the data block.

In the case of a read-only optical disc of the existing CD format, a physical address is not always set for the inner circumference of the read-in area that lies inside the program area. That is, the existing CD format dictates no physical addresses for the inner circumference of the program area provided on a read-only optical disc. To move the optical head of an optical disc apparatus to the program area from any part inside the program area, it is necessary to repeat an appropriate seek operation until the optical head reaches the program area. Obviously, it takes much time to repeat the seek operation, ultimately decreasing the access speed of the optical head.

In a double-density, read-only optical disc according to the invention (hereinafter referred to as "double-density CD-ROM"), a physical address is set for the read-in area located inside the program area. The distance the optical head must move is therefore calculated from the physical addresses set for all recording areas including the read-in area. This increases the access speed of the optical head. Thus, the physical address value gradually increases from the inner circumference toward the outer circumference of the disc, also in the double-density CD-ROM.

An optical disc apparatus 20 designed to record and reproduce data on and from the single-density CD-R and the double-density CD-R, both described above, will be described with reference to FIG. 14.

Figure 14:
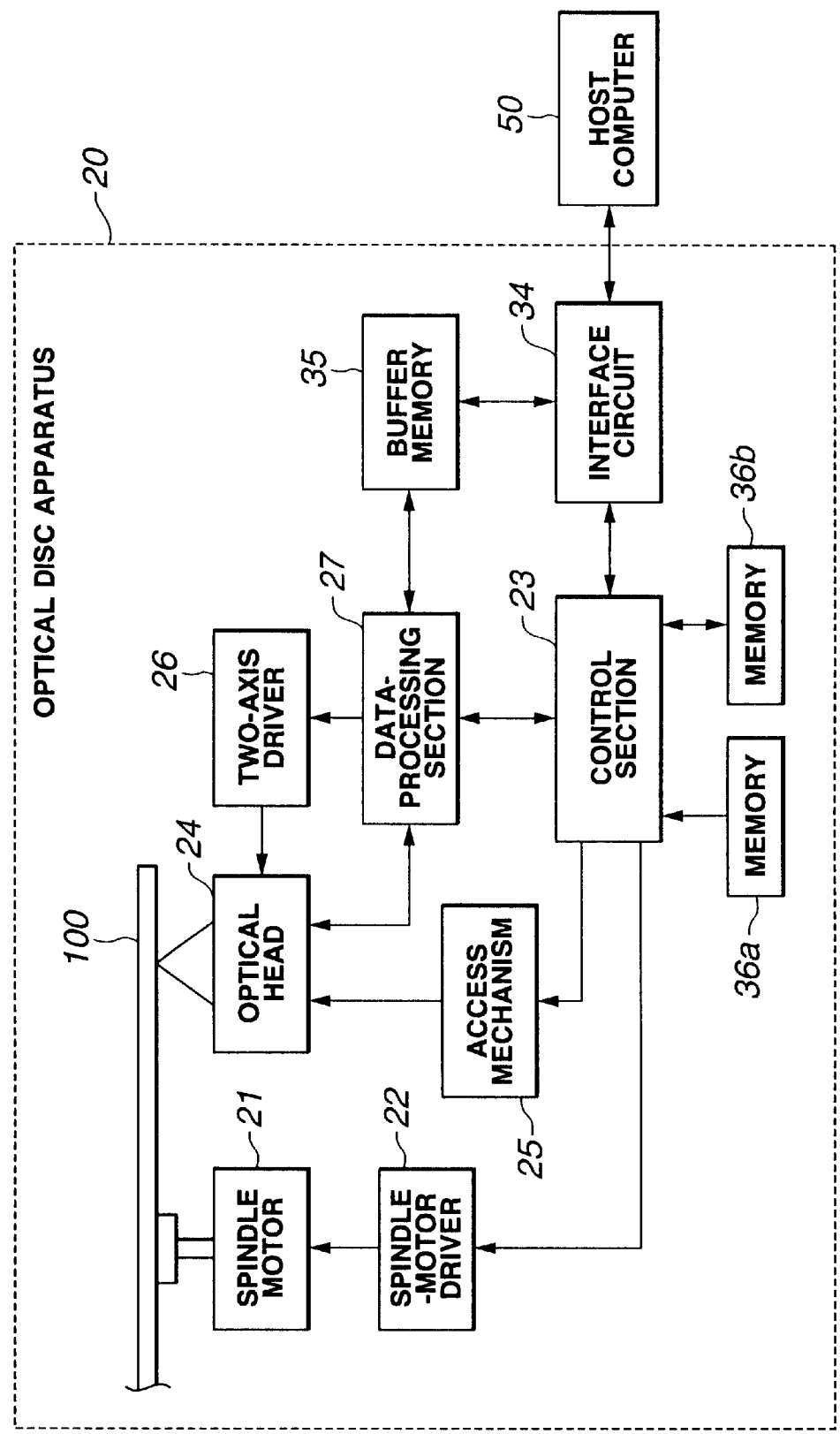
FIG. 14 is a block diagram of an optical disc apparatus according to the present invention.

As shown in FIG. 14, the optical disc apparatus 20 comprises a spindle motor 21 and a spindle-motor driver 22. A CD-R 100 (either a single-density CD-R or a double-density CD-R), which is a recording medium, is connected to the shaft of the spindle motor 21.

If the CD-R 100 is a single-density CD-R, the spindle-motor driver 22 drives the spindle motor 21 at a CLV (Constant Linear Velocity) of about 1.2 m/sec, whereby the CD-R 100 is therefore rotated at the same CLV. If the CD-R 100 is a double-density CD-R, the spindle-motor driver 22 drives the spindle motor 21 at a CLV (Constant Linear Velocity) of about 0.9 m/sec, whereby the CD-R 100 is, therefore rotated at the same CLV. The spindle-motor driver 22 is controlled by the control section 23 that is incorporated in the optical disc apparatus 20.

The optical disc apparatus 20 comprises an optical head 24 and an access mechanism 25. The optical head 24 applies a laser beam having a wavelength of 780 nm to the CD-R 100 that the spindle motor 21 is rotating. The optical head 24 detects the light reflected from the CD-R 100 and generates a signal from the light.

The access mechanism 25 can move the optical head 24 in the radial direction of the CD-R 100. When the access mechanism 25 moves the optical head 24 to a target recording track provided on the CD-R 100, the optical head 24 makes an access to that recording track. Note that the access mechanism 25 operates under the control of the control section 23.

The optical head 24 has an objective lens (not shown). The objective lens can be moved along two axes by the two-axis driver 26 incorporated in the optical disc apparatus 20. Along the first axis the lens can move in the radial direction of the CD-R 100. Along the second axis, the lens can move toward and away from the CD-R 100. When the two-axis driver 26 moves the objective lens along the first axis, focusing servo-control is achieved. When the two-axis driver 26 moves the objective lens along the second axis, tracking servo-control is accomplished.

The optical disc apparatus 20 further comprises a data-processing section 27. The data-processing section 27 processes data to be written on the CD-R 100, generating a write signal. The write signal is supplied to the optical head 24. The section 27 receives the signal output from the optical head, converts this signal to digital data and output the digital data, or the data reproduced from the CD-R 100.

Figure 15:
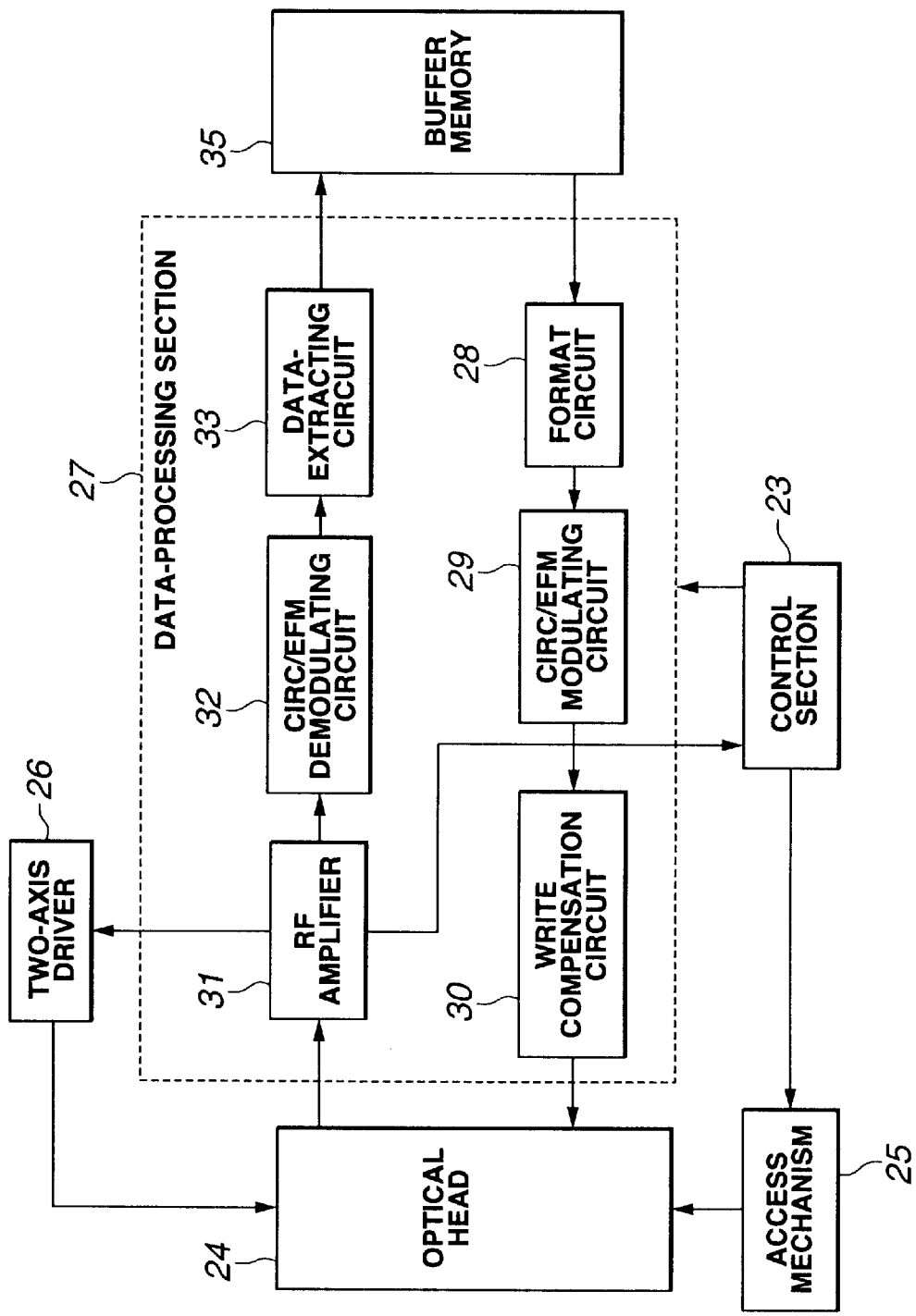
FIG. 15 is a block diagram of the data-processing section provided in the optical disc apparatus.

As shown in FIG. 15, the data-processing section 27 has a data-recording system and a data-reproducing system. The data-recording system comprises a format circuit 28, a CIRC/EFM modulating circuit 29, and a write compensation circuit 30. The data-reproducing system comprises an RF amplifier 31, a CIRC/EFM demodulating circuit 32, and a data-extracting circuit 33.

How the data-processing section 27 operates will be described. First, the format circuit 28 receives the data to be written on the CD-R 100 (i.e., record data). The circuit 28 processes the data, generating data blocks in the predetermined format described above. In this process, the physical addresses described above are written into the subcode Q and block header of each data block. The data blocks, thus generated in the format circuit 28, are supplied to the CIRC/EFM modulating circuit 29.

The CIRC/EFM modulating circuit 29 uses CIRCs, correcting errors in the data blocks. The circuit 29 then performs EFM modulation on the data blocks, generating record data. The record data is supplied from the circuit 29 to the write compensation circuit 30.

The write compensation circuit 30 generates a record signal from the record data. The record signal is supplied to the optical head 24. The optical head 24 emits a laser beam that has been modulated in accordance with the record signal. The laser beam is applied to a recording area provided on the CD-R 100, whereby the record data is written in the recording area of the CD-R 100.

To reproduce the data from the CD-R 100, the optical head 24 applies a reproducing laser beam to the CD-R 100. The optical head 24 receives the light reflected from the CD-R 100 and generates a voltage signal from the light. The voltage signal is supplied to the RF amplifier 31.

The RF amplifier 31 generates a signal (RF signal), a focussing-error signal, a tracking-error signal, a wobble signal and the like from the voltage signal supplied from the optical head 24. The focussing-error signal and the tracking-error signal are supplied to the two-axis driver 26. The two-axis driver 26 moves the objective lens of the optical head 24 along the two axes in accordance with the focussing-error signal and the tracking-error signal. The optical head 24 is thereby servo-controlled to eliminate the focussing error and the tracking error.

The wobble signal the RF amplifier 31 has generated is supplied to the control section 23. The control section 23 demodulates the wobble signal, detecting the wobble information. From the wobble information the section 23 acquires the physical address of that part of the CD-R 100 which is irradiated with the laser beam and other data such as special information. From the physical address the section 23 calculates the distance the optical head 24 should be moved to reach a target recording track on the CD-R 100. The control section 23 controls the access mechanism 25 in accordance with the distance thus calculated. The access mechanism 25 moves the optical head 24 to the target recording track provided on the CD-R 100. Further, the control section 23 determines whether the CD-R 100 connected to the spindle motor 21 is a single-density CD-R or a double-density CD-R, from the pattern of the synchronizing signal SYNC detected from the wobble information. If the CD-R 100 is found to be a single-density one, the control section 23 controls the data-processing section 27, whereby the components of the section 27 may perform their functions to record and reproduce data on and from a single-density CD-R. If the CD-R 100 is found to be a double-density one, the control section 23 controls the data-processing section 27, whereby the components of the section 27 may perform their functions to record and reproduce data on and from a double-density CD-R. Moreover, the control section 23 controls the data-processing section 27 in accordance with the special information, so that the section 27 sets the power of a laser beam and controls the rotating speed of the CD-R 100.

The signal reproduced by the RF amplifier 31 from the CD-R 100 is subjected to a binarization process and clock-extracting process. The signal is thereby converted to digital data. The digital data supplied to the CIRC/EFM demodulating circuit 32.

The CIRC/EFM demodulating circuit 32 performs EFM demodulation on the digital data. The circuit 32 corrects the errors in the digital data, by using CIRCs. The digital data, thus EFM-demodulated and error-corrected, is supplied to the data-extracting circuit 33.

The data-extracting circuit 33 removes the data accompanying the digital data, thus extracting the data reproduced from the CD-R 100. The data thus extracted by the circuit 33 is supplied from the data-processing section 27.

The optical disc apparatus 20 further comprises an interface circuit 34, a buffer memory 35, and two memories 36*a* and 36*b*. The interface circuit 34 is provided to transfer data between the apparatus 20 and a host computer 50 or the like. The host computer 50 supplies data to be recorded on the CD-R 100, to the interface circuit 34 of the optical disc apparatus 20. In the apparatus 20, the buffer memory 35 temporarily stores the data supplied from the host computer 50. The data is then supplied from the buffer memory 35 to the data-processing section 27. The buffer 35 temporarily stores the data reproduced from the CD-R 100, too, before the data is transferred to the host computer 50 through the interface circuit 34.

In the optical disc apparatus 20, the control section 23 controls some other components of the apparatus 20. The memories 36*a* and 36*b* are connected to the control section 23. The memory 36*a* is a ROM and the memory 36*b* is a RAM. The memory 36*a* stores control programs for controlling some other components of the optical disc apparatus 20. The control section 23 uses the memory 36*a* as a work area to control some other components of the apparatus 20. The control programs stored in the memory 36*a* includes a program for controlling the components to record and reproduce data on and from a single-density CD-R and a program for controlling the components to record and reproduce data on and from a double-density CD-R. The control section 23 determines whether the CD-R 100 connected to the spindle motor 21 is a single-density one or a double-density one, from the pattern of the synchronizing signal SYNC detected from the wobble information. The control section 23 then controls some other components of the apparatus 20, in accordance with the program for controlling the CD-R 100 connected to the spindle motor 21.

The control section 23 controls the format circuit 28 of the data-processing section 27 in one way to write data on a single-density CD-R, and in another way to write date on a double-density CD-R. Physical addresses are thereby set in a specific manner in the single-density CD-R, and in a difference manner in the double-density CD-R.

How the control section 23 controls the format circuit 28 will be explained, with reference to FIG. 16. Note that FIG. 16 is a function-block diagram illustrating the control the section 23 performs on the format circuit 28.

Figure 16:
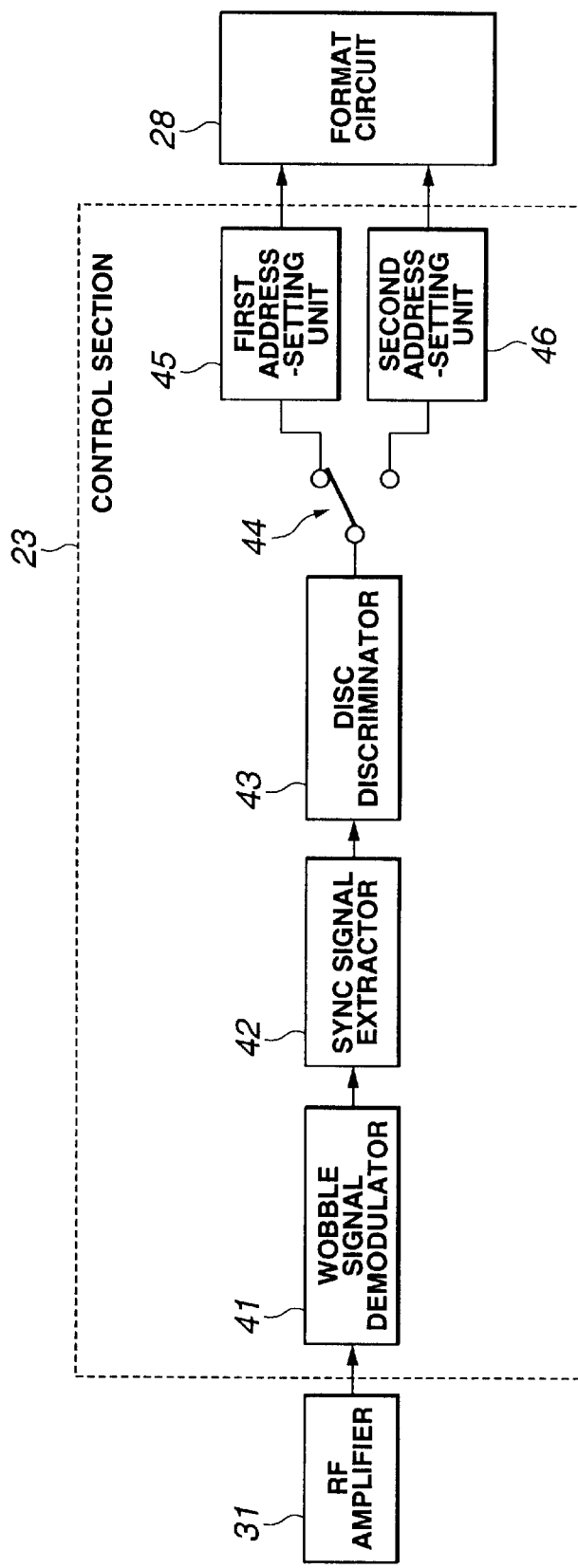
FIG. 16 is a function-block diagram illustrating how the control section controls the format circuit in the optical disc apparatus.

As FIG. 16 shows, the control section 23 comprises a wobble signal demodulator 41, a synchronizing signal extractor 42, a disc discriminator 43, a switch 44, and two address-setting units 45 and 46. As pointed out above, the RF amplifier 31 of the data-processing section 27 supplies a wobble signal to the control section 23. In the control section 23, the wobble signal demodulator 41 demodulates the wobble signal, thus detecting the wobble information represented by the wobbling groove 5 made in the surface of the CD-R 100.

The synchronizing signal extractor 42 extracts the synchronizing signal SYNC form the wobble information thus detected. Then, the disc discriminator 43 determines whether the CD-R 100 is a single-density one or a double-density one, from the pattern of the synchronizing signal SYNC extracted from the wobble information.

In accordance with whether the CD-R 100 is a single-density one or a double-density one, the switch 44 selects one of the two address-setting units 45 and 46. More precisely, the switch 44 is connected to the first address-setting unit 45 if the CD-R 100 is a single-density disc on which data shall be written. In this case, the first address-setting unit 45 sets physical addresses on the single-density CD-R as is illustrated in FIGS. 12A and 12B. In accordance with the physical addresses thus set, the control section 23 controls the format circuit 28 provided in the data-processing section 27.

That is, if the CD-R 100 is found to be a single-density disc, the control section 23 sets physical addresses in the MSF format on the CD-R 100 such that a physical address 0 is set for the head of the program area 14 and that physical addresses 1, 2, 3, . . . are sequentially set toward the outer circumference of the program area 14. In the area inside the program area 14, physical addresses are in the MSF format such that the physical address value gradually increases from the innermost part of the disc, having the maximum value at the part immediately preceding the program area 14. The control section 23 causes the format circuit 28 to write an MSF-format physical address in the subcode Q and block header of each data block that will be written on single-density CD-R.

The control section 23 calculates the distance the optical head 24 must move, from the physical address written in the subcode Q and block header of the data block and from the physical address obtained from the wobble information and designating the present position of the head 24. In accordance with the distance thus calculated, the control section 23 controls the access mechanism 25. The optical head 24 is thereby moved to the target recording track on the single-density CD-R and writes the data in the target track.

The disc discriminator 43 may determine that the CD-R 100 is a double-density one. In this case, the switch 44 is connected to the second address-setting unit 46. Thus, the second address-setting unit 46 sets physical addresses on the double-density CD-R as is illustrated in FIGS. 13A and 13B. In accordance with the physical addresses thus set, the control section 23 controls the format circuit 28 provided in the data-processing section 27.

That is, if the CD-R 100 is found to be a double-density disc, the control section 23 sets physical addresses in the HMSF format and binary format, in one-to-one correspondence, on the CD-R 100 such that the physical address value gradually increases from the innermost part of the disc toward the outermost part thereof. In other words, the physical addresses are expressed in both the HMSF format and the binary format so that the address value gradually increases toward the outermost part, over the entire radius of the disc and that the physical address takes a positive value at the head of the program area 14. The control section 23 causes the format circuit 28 to write an HMSF-format physical address and a binary physical address, respectively, in the subcode Q and block header of each data block that will be written on single-density CD-R.

The control section 23 calculates the distance the optical head 24 must move, from the physical address written in the subcode Q and block header of the data block and from the physical address obtained from the wobble information and designating the present position of the head 24. In accordance with the distance thus calculated, the control section 23 controls the access mechanism 25. The optical head 24 is thereby moved to the target recording track on the single-density CD-R and writes the data in the target track.

As described above, the control section 23 determines whether the CD-R 100 is a single-density one or a double-density one, in order to record or reproduce data on and from the CD-R 100, and controls some other components of the optical disc apparatus 20 in accordance with the type of the CD-R 100. The optical disc apparatus 20 can therefore reliably record and reproduce data on and from both a single-density CD-R and a double-density CD-R.

In the optical disc apparatus 20, the control section 23 controls the format circuit 28 of the data-processing section 27 in one way to write data on a single-density CD-R, and in another way to write data on a double-density CD-R. To be more specific, the control section 23 sets physical addresses of the existing format on the single-density CD-R, and physical addresses of new format on the double-density format. Hence, the apparatus 20 can record and reproduce data on and from the single-density CD-R in the existing method, can also can record data at higher density on the double-density CD-R and read the data therefrom, while maintaining the high access speed of the optical head 24.

In the optical disc apparatus 20 described above, the disc discriminator 43 determines whether the CD-R 100 is a single-density one or a double-density one, from the pattern of the synchronizing signal SYNC extracted from the wobble information. Nonetheless, the method of determining the type of the CD-R 100 is not limited to this. At the time of reproducing data from the disc, the type of the disc may be determined in accordance with, for example, whether the block header contains MSF-format physical addresses or binary-format physical addresses. At the time of recording data on the disc, the type of the disc may be determined from the disc-type data contained in the special information included in the wobble information in the read-in area 13.

What is claimed is:

1. An optical disc apparatus, comprising:

a motor for rotating an optical disc;

an optical head for applying a focused beam to the optical disc rotated by the motor and for detecting a beam reflected from the optical disc;

an access mechanism for causing the optical head to access a position on the optical disc; and a controller for detecting a plurality of physical addresses of recording areas provided on the optical disc and for controlling the access mechanism in accordance with the plurality of physical addresses, wherein when the optical disc has a recording region and the physical addresses extend over the entire radial extent of the recording region that includes a plurality of recording areas each having a physical address recorded as subcode in each block of data in a time-axis-data format and each physical address is also recorded in a spiral track as wobble information in a binary-data format and values corresponding to each of the plurality of physical addresses gradually increase continuously from a minimum value at an inner part of the recording region toward an outer part of the recording region, while the physical addresses in the time-axis-data format and the physical addresses in the binary-data format are in one-to-one correspondence for the entire recording region, wherein a minimum physical address value corresponds to a physical address at an inner part of the recording region and is a positive non-zero value, and the recording areas include a program area for recording user data and auxiliary recording areas for recording data other than the user data, and the controller controls the access mechanism in accordance with the physical address, and wherein the controller determines whether the optical disc is one of a first optical disc on which physical addresses are recorded in the time-axis-data format and the binary-data format and a second optical disc on which physical addresses are recorded in only the time-axis-data format; and when the optical disc rotated by the motor is the first optical disc the controller determines that a physical address at a head of the program area for recording user data has a positive value, and when the optical disc rotated by the motor is the second optical disc the controller determines that the physical address at the head of the program area for recording user data has a value of 0.

2. The optical disc apparatus according to claim 1, wherein the first and second optical discs have the spiral track in the form of a groove that wobbles in accordance with the wobble information representing the physical addresses provided on the optical disc and the controller determines whether the optical disc rotated by the motor is one of the first optical disc and the second optical disc from a synchronization pattern obtained by reading the wobble information.

* * * * *